April 5, 1960     E. C. RITTER     2,931,054

TUBULAR KNOCK-DOWN BED FRAME

Filed Feb. 15, 1957

INVENTOR.
Emil C. Ritter

BY *Irving Seidman*

ATTORNEY

United States Patent Office 2,931,054
Patented Apr. 5, 1960

2,931,054

TUBULAR KNOCK-DOWN BED FRAME

Emil C. Ritter, New York, N.Y., assignor to Loriku, Inc., Yonkers, N.Y., a corporation Application February 15, 1957, Serial No. 640,416

3 Claims. (Cl. 5—202)

This invention relates to bed frames and, more particularly, to an improved, simple, rugged, tubular bed frame easily assembled without the use of tools, clamps, or bolts and easily adjusted to single, twin, three-quarters, or full bed widths.

The bed frame of the present invention is a low or "Hollywood" bed frame arranged to support a box spring and mattress, with or without head frames. As presently constructed, bed frames of this type are formed of wooden or angle iron members assembled by the use of bolts, clamps and the like. The projecting parts of the bed frame frequently cause injury to the legs and damage to stockings.

In the present invention, these difficulties are eliminated by the use of a reinforced tubular construction involving tubular side rails bent at their ends to form legs and interconnected by tubular cross rails at each end.

Preferably, the connection is made in such a way that the end rails may be swung 90° about the axis of the legs of the side rails, so that compact, substantially flat units may be provided for shipment or storage. This may be effected by forming 90° arcuate slots in the legs, placing a liner tube in each leg, and securing the arcuately flattened ends of the cross rail to the liner by fasteners extending through the slot. Alternatively, a sleeve may be placed over each slotted leg, and the arcuately flattened ends secured to such sleeves by fasteners having heads projecting into the arcuate slots.

Width adjustment is effected by using a pair of telescoped tubes as each cross rail, with a thumb screw locking the tubes at the adjusted width.

For an understanding of the invention principles, reference is made to the following description of typical embodiments thereof as illustrated in the accompanying drawings. In the drawings.

Figure 1:
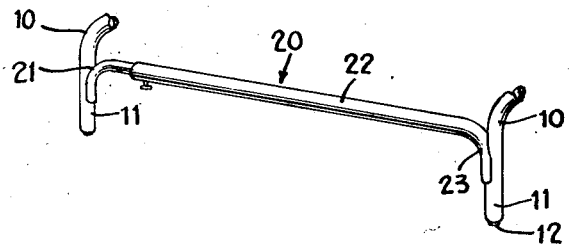
Fig. 1 is a partial perspective view of a bed frame embodying the invention.

Referring to Figs. 1 through 4, the bed frame is illustrated as comprising side rails 10 and cross rails 20. Side rails 10 are tubular, and have bent ends 11 forming legs for the bed frame. Suitable rollers or balls 12 in the ends of legs 11 serve as anti-friction bearings for the bed frame.

Each cross rail 20 comprises telescoped tubes 21, 22 having their outer ends bent, as at 23, and arcuately flattened to provide outer concave surfaces conformingly engageable with legs 11 of side rails 10.

Figure 3:
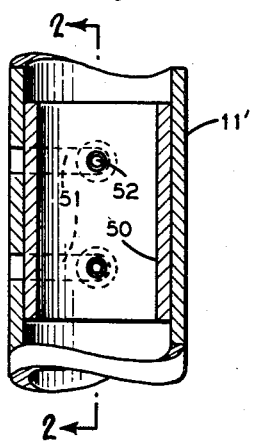
Fig. 3 is an axial sectional view on the line 3—3 of Fig. 2.
Figure 2:
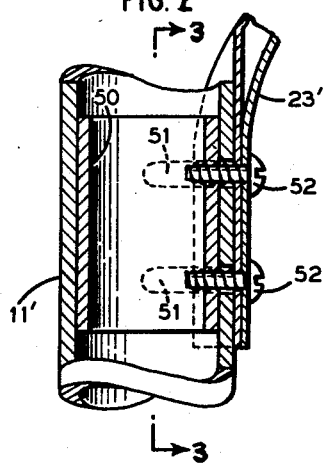
Fig. 2 is an axial sectional view, on the line 2—2 of Fig. 3, illustrating a preferred form of connection between the side and end rails.

Referring to Figs. 2 and 3, the side and end rails are preferably interconnected so as to "fold" about the axes of legs 11'. For this purpose, each leg 11' has a sleeve 50 inserted therein and is formed with two or more arcuate slots 51. Sleeve 50 has apertures aligned with each slot to receive self-tapping screws 52 inserted through aligned apertures in arcuately flattened cross rail ends 23' and through slots 51. The slots 51 allow 90° of relatively swinging movement of the side rails and end rails to provide for flat folding of the assembly for shipment or storage.

Figure 4:
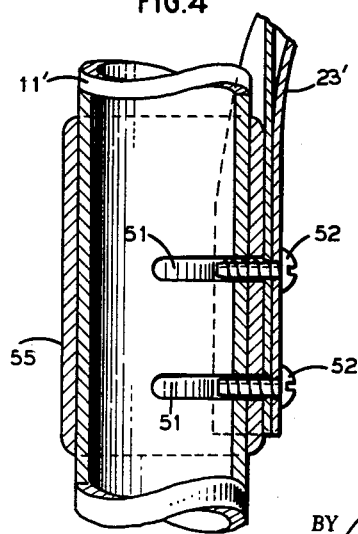
Fig. 4 is a view, similar to Fig. 2, of an alternative form of connection.

Fig. 4 illustrates an alternative arrangement. In this case, a sleeve 55 is slipped over leg 11', being apertured at slots 51. Screws 52 extend through sleeve 55 and into slots 51. Sleeve 55 covers the slots 51, which latter provide for "folding" of the rails.

The several parts of the bed are sold and packaged in knockdown relation, thus providing a compact flat package.

While specific embodiments of the invention have been shown and described in detail to illustrate the application of the invention principles, it will be understood that the invention may be embodied otherwise without departing from such principles.

What is claimed:

1. A bed frame comprising, in combination, a pair of one-piece tubular side rails having legs bent downwardly from each end; a pair of tubular cross rails having ends bent at substantially right angles to the length thereof and arcuately flattened to provide outwardly concave surfaces juxtaposable with said legs; cooperable slot and fastener formations forming permanent parts of said legs and ends and releasably interconnecting said side and cross rails for selective relative movement; said slot and fastener formations comprising arcuate slots in the side rail legs, sleeve means telescoped with said side rail legs, and releasable fastener means extending through said arcuately flattened ends, said slots, and apertures in said sleeve means; said slots providing for swinging of said cross rails about the axes of the side rail ends.

2. A bed frame as claimed in claim 1 in which said sleeve means comprises a tubular sleeve within each leg.

3. A bed frame as claimed in claim 1 in which said sleeve means comprises a tubular sleeve embracing each leg and engaged by said arcuately flattened ends.

References Cited in the file of this patent

UNITED STATES PATENTS

| | | |
|---|---|---|
| 608,546 | Coburn | Aug. 2, 1898 |
| 1,064,357 | Mellon | June 10, 1913 |
| 1,080,577 | Pascale et al. | Dec. 9, 1913 |
| 2,523,988 | Fox | Sept. 26, 1950 |
| 2,611,907 | Clerc | Sept. 30, 1952 |
| 2,666,478 | Shwayder | Jan. 19, 1954 |
| 2,772,424 | Roche | Dec. 4, 1956 |
| 2,809,383 | Fenner | Oct. 15, 1957 |